United States Patent
Stumer

(10) Patent No.: US 6,473,437 B2
(45) Date of Patent: *Oct. 29, 2002

(54) NETWORK CALL PARK SERVICE

(75) Inventor: Peggy M. Stumer, Boca Raton, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,136

(22) Filed: Jul. 2, 1998

(65) Prior Publication Data
US 2002/0130791 A1 Sep. 19, 2002

(51) Int. Cl.[7] .................................................. H04L 12/66
(52) U.S. Cl. ........................................ 370/462; 370/360
(58) Field of Search ........................ 379/92.01, 142.07, 379/162, 163, 211.01, 212.01, 265.01; 370/351–4, 419–422

(56) References Cited

U.S. PATENT DOCUMENTS

| 4,658,416 A | 4/1987 | Tanaka .......................... 379/57 |
|---|---|---|
| 4,682,353 A * | 7/1987 | Inoue et al. ................. 379/163 |
| 5,247,670 A | 9/1993 | Matsunaga ................... 395/650 |
| 5,274,700 A | 12/1993 | Gechter et al. ............. 379/210 |
| 5,410,593 A | 4/1995 | Kamota ....................... 379/393 |
| 5,521,970 A | 5/1996 | Herrick et al. ............... 379/201 |
| 5,550,904 A | 8/1996 | Andruska et al. ........... 379/127 |
| 5,617,471 A | 4/1997 | Rogers et al. .............. 379/212 |
| 5,640,449 A | 6/1997 | Worley et al. .............. 379/201 |
| 5,668,862 A | 9/1997 | Bannister et al. ........... 379/201 |
| 5,742,596 A * | 4/1998 | Baratz et al. ................ 370/356 |
| 5,970,134 A * | 10/1999 | Highland et al. ........... 379/265 |

FOREIGN PATENT DOCUMENTS

| GB | 2 158 678 | 11/1985 |
| WO | WO 98/36550 | 8/1998 |

* cited by examiner

Primary Examiner—David Vincent
(74) Attorney, Agent, or Firm—Francis G. Montgomery

(57) ABSTRACT

A service and apparatus for enabling supplementary service functions, such as call parking, to be implemented in a communication network having one or more servers. The call parking service is adapted to enable the called party to park the call anywhere within the network, including outside the local server in a multi-server network. The call parking service includes an invite request unit for invoking the call parking service. A call park request unit is provided to respond to the invite request unit by establishing a connection to a call park destination for enabling the caller to be parked at the call park destination. A retrieval request unit is provided for connecting a call pickup party with the parked caller for completing the connection. An exception handler may also be provided to ensure that network problems in the call parking procedure do not result in a lost call.

25 Claims, 14 Drawing Sheets

NETWORK CALL PARK SERVICE

BACKGROUND OF THE INVENTION

1. Field of the Invention

The present invention generally relates to a network call parking service and, more particularly, to a network call parking service in a multi-server communication network which allows call parking and retrieval of any call connected to any server in the network.

2. Description of the Prior Art

It is well known that modern telephone services are able to provide a wide variety of convenience features or supplementary services to enhance calling convenience. For example, call parking is a particular supplementary service often used by callers. Known call parking services provide the call recipient the ability to park, i.e., place on hold, the caller at a particular extension. This is accomplished, generally, by the called party dialling an access code or depressing a park key, followed by the local number of the park destination. The parked call may then be retrieved locally by the answering party by dialling an access code or depressing a park answer key followed by the local number of the park destination at which the caller is parked.

In known private/public telecommunications network/exchange (PTN/PTNX)-based networks and client-server based distributed networks, users are located or reside locally in PTN/servers that are interconnected by high speed and/or high bandwidth networks. Unfortunately, in such known PTN/PTNX based networks, call park and retrieval is implemented only locally within a single PTN/server, and thus calls may not be parked and retrieved by users that are within the network but connected to another server in the network.

For example, in a sales type situation, where multiple servers host multiple users working in a large room with cubicles, a customer may call the company to inquire about a particular product. The caller asks if a red widget is in stock and the sales person sees on the computerized inventory screen that one is left in stock but that no color is indicated. The sales person, before checking the stock room, parks the call to a phone that is located in the stock room. The sales person's phone and the stock room phone are hosted by different servers. Upon reaching the stock room and seeing that the widget is green, the sales person picks up the stock room phone and depresses the park retrieval key, and is again talking with the parked caller. In known call park services, the sales person would be unable to park the call to the remote phone (i.e., physical or phantom/logical device) in a manner that would allow the sales person to pick up the call in the stock room, since the remote phone would be attached to a different remote server and would not have access to the server where the call was parked.

Therefore, what is needed is a system for enabling call park and retrieve from anywhere within a multi-server network regardless of which server the call parking and retrieving user may be connected.

SUMMARY OF THE INVENTION

Briefly, the present invention relates to a service and apparatus for enabling supplementary service functions, such as call parking, to be implemented in a communications network having more than one server. The multi-server call parking system is adapted to enable call parking and retrieval from anywhere within the network, including calls parked on a different server within the multi-server network. The call parking system includes an (optional) invite request unit for invoking the call parking service. A call park request unit establishes a connection to a call park destination for enabling the call to be parked at the selected call park destination. The destination is generally a user selectable parking location located anywhere within the network. A retrieval request unit, for performing park retrieval functions, connects a retrieving user with the parked call. Upon successful retrieval, the parked party and the retrieving party are connected in a two-party connection. Optionally, an exception handler may be provided to handle problems that may potentially arise during the call parking procedure. Either user in the call may park the other user as long as that user is a subscriber of the network park service.

BRIEF DESCRIPTION OF THE DRAWINGS

Other features, objects and advantages of the present invention will become will become readily apparent and understood upon consideration of the following detailed description and attached drawings, wherein.

DETAILED DESCRIPTION OF THE INVENTION

Figure 1:
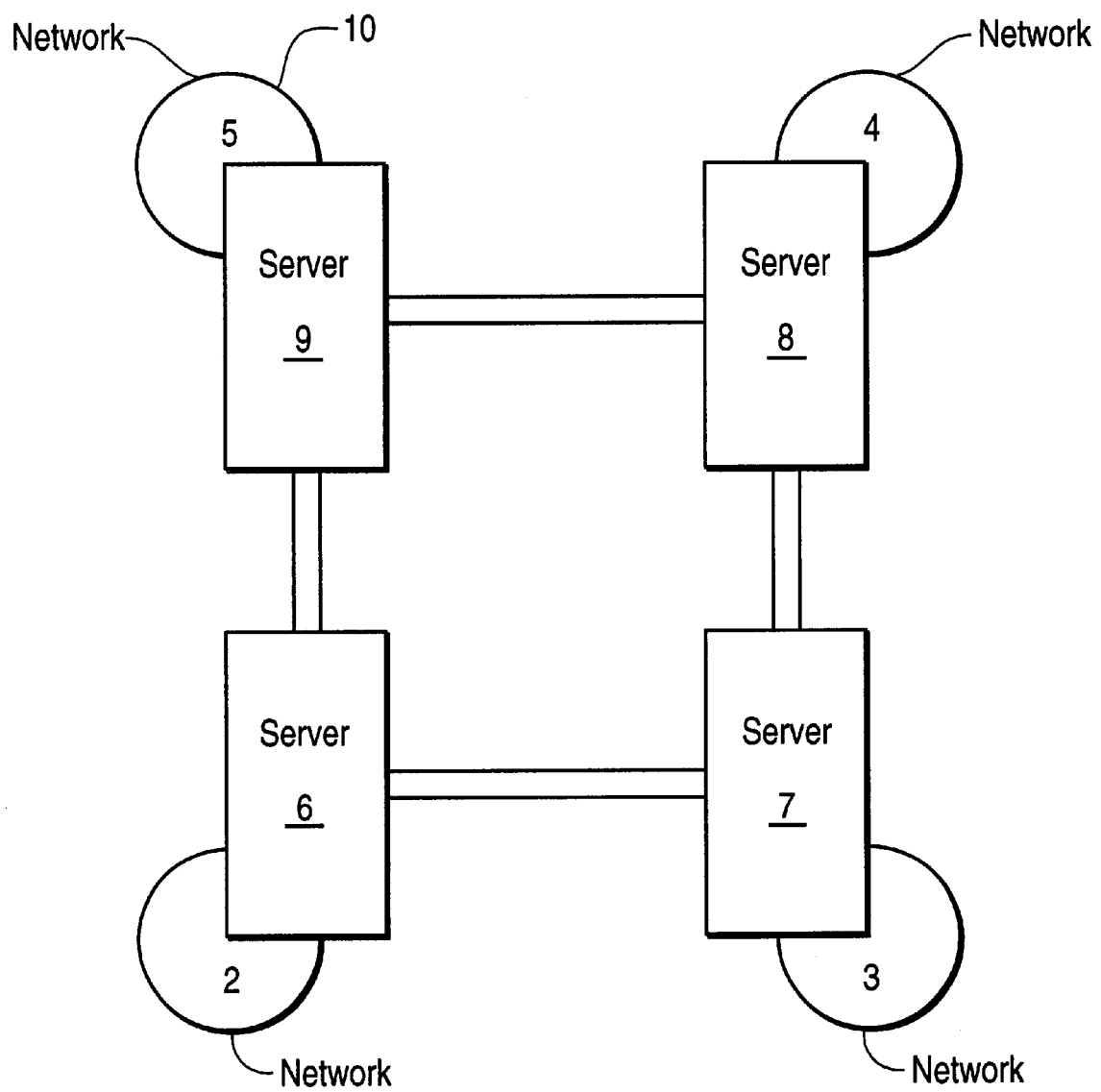
FIG. 1 is a block diagram of a known interconnected communications network.

The present invention relates to a system for enabling supplementary service functions, and in particular call parking, in a communication network having a plurality of interconnected servers, which enables calls to a user to be parked at a network destination and retrieved by another user anywhere on the network, including when located on a different server than the parked calls. Call parking is initiated, for example, by dialing an access code or depressing a park line/key followed by the park destination number. The call may be retrieved in a similar manner.

An important aspect of the invention is that the call parking system is dependent only on the network architecture and operational environment of the implementor and is Application Program Interface (API) and operating system (OS) independent. As will be appreciated by those of ordinary skill in the art, the principles of the present invention as also applicable to a wide variety of different network implementations and may be used as a feature in any known communications server, including, but not limited to, voice services which may span public networks, private networks and interwork between public and private networks, including standard networks such as International Standards Organization (ISO)/European Computer Manufacturers Association for Standardizing Information and Communication Services (ECMA)/European Telecommunications Standards Institute (ETSI)/Private Integrated Services Digital Network (PISDN) Signalling Standard at the 'Q' reference point (QSIG) compliant integrated services digital network (ISDN) networks, in a computer supported telephony applications/computer telephony interface (CSTA/CTI) network via applications programming interfaces (API) such as Telephony Application Programming Interface (TAPI) and/ or a Telephony Services Application Programming Interface (TSAPI) or, as mentioned above, a combination of both ISDN and CSTA/CTI networks.

An important aspect of the invention is that the multi-server call parking service is transparent to all users and generally does not require any special handling on the part of the parking user. Accordingly, the service may use the same user interface as local call parking and may appear to operate in a manner similar to known local call parking services. Thus, the call parking system in accordance with the present invention can be seamlessly integrated into an existing local call parking user interface. As such, since local call parking services have vendor specific user interfaces, it is not necessary to extend or change the user interface for network call parking operation. Alternatively, interworking with a generalized network directed call pickup service for park retrieval and generalized network recall service for park recall is possible. Another advantage of the call parking service is the ability to detect and handle network failures to attempt to prevent calls from being dropped, lost or forgotten during parking or retrieval.

Figure 2:
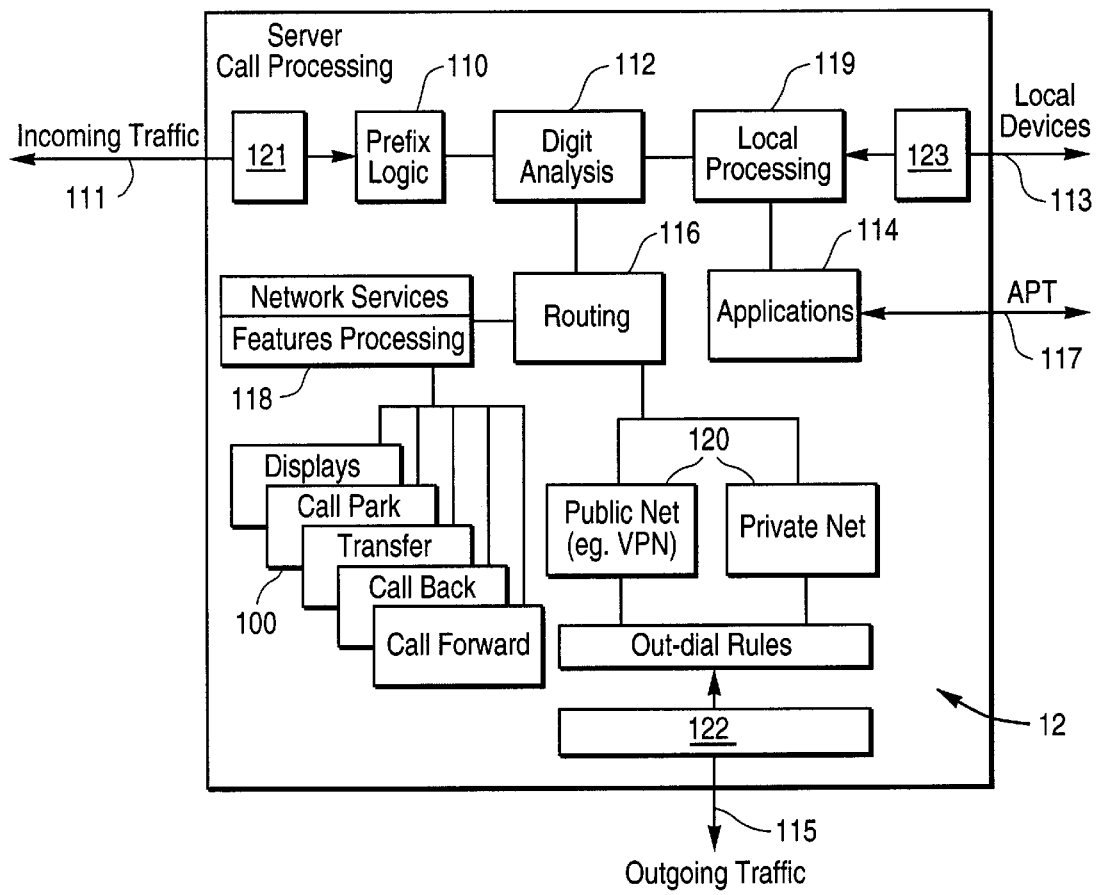
FIG. 2 is a block diagram of a telecommunications server embodying the multi-server call park system in accordance with the present invention.
Figure 3:
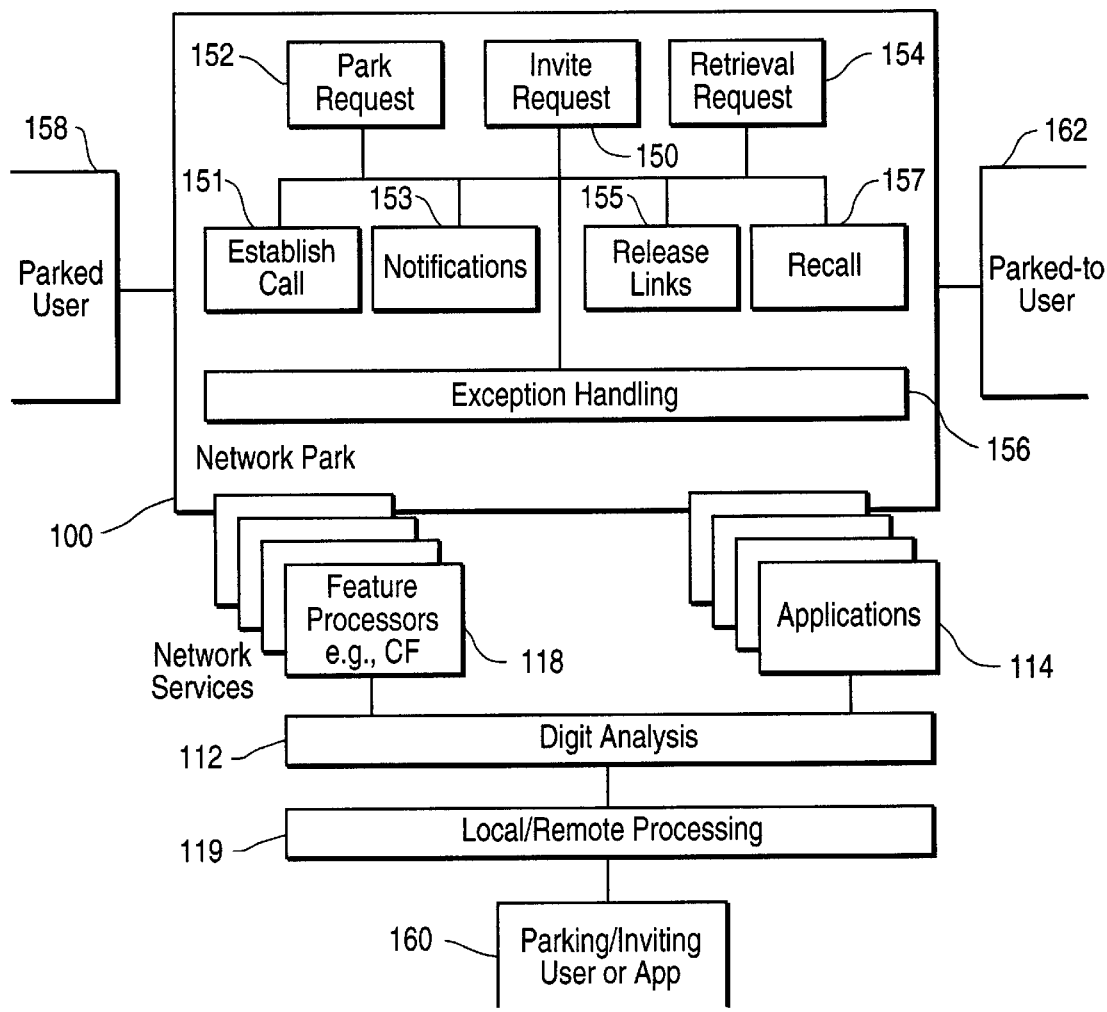
FIG. 3 is a detailed block diagram of the multi-server call parking system in accordance with the present invention.
Figure 8:
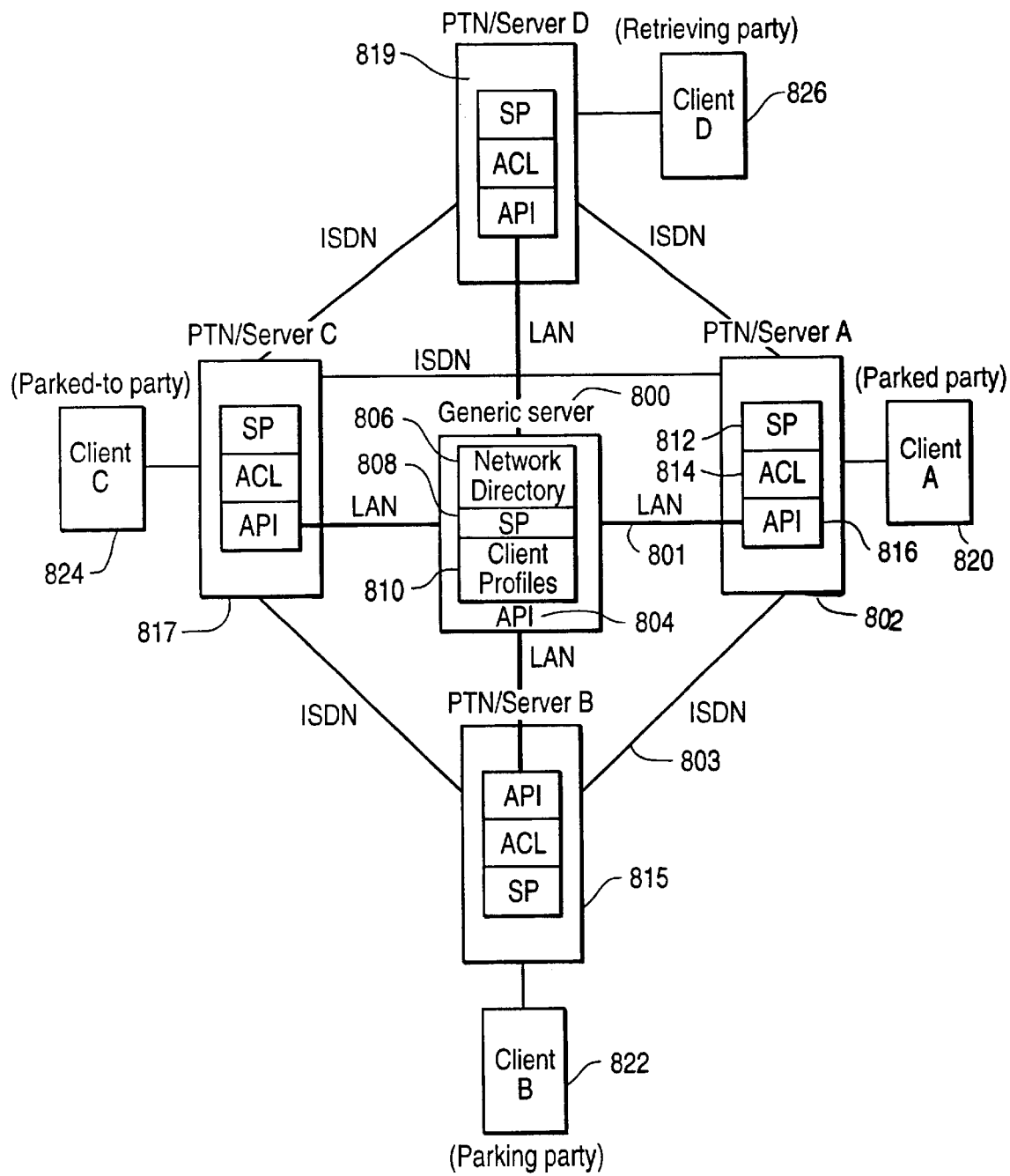
FIG. 8 is a block diagram of a particular embodiment of the multi-server call park system illustrating a client/server method of operation.
Figure 9:
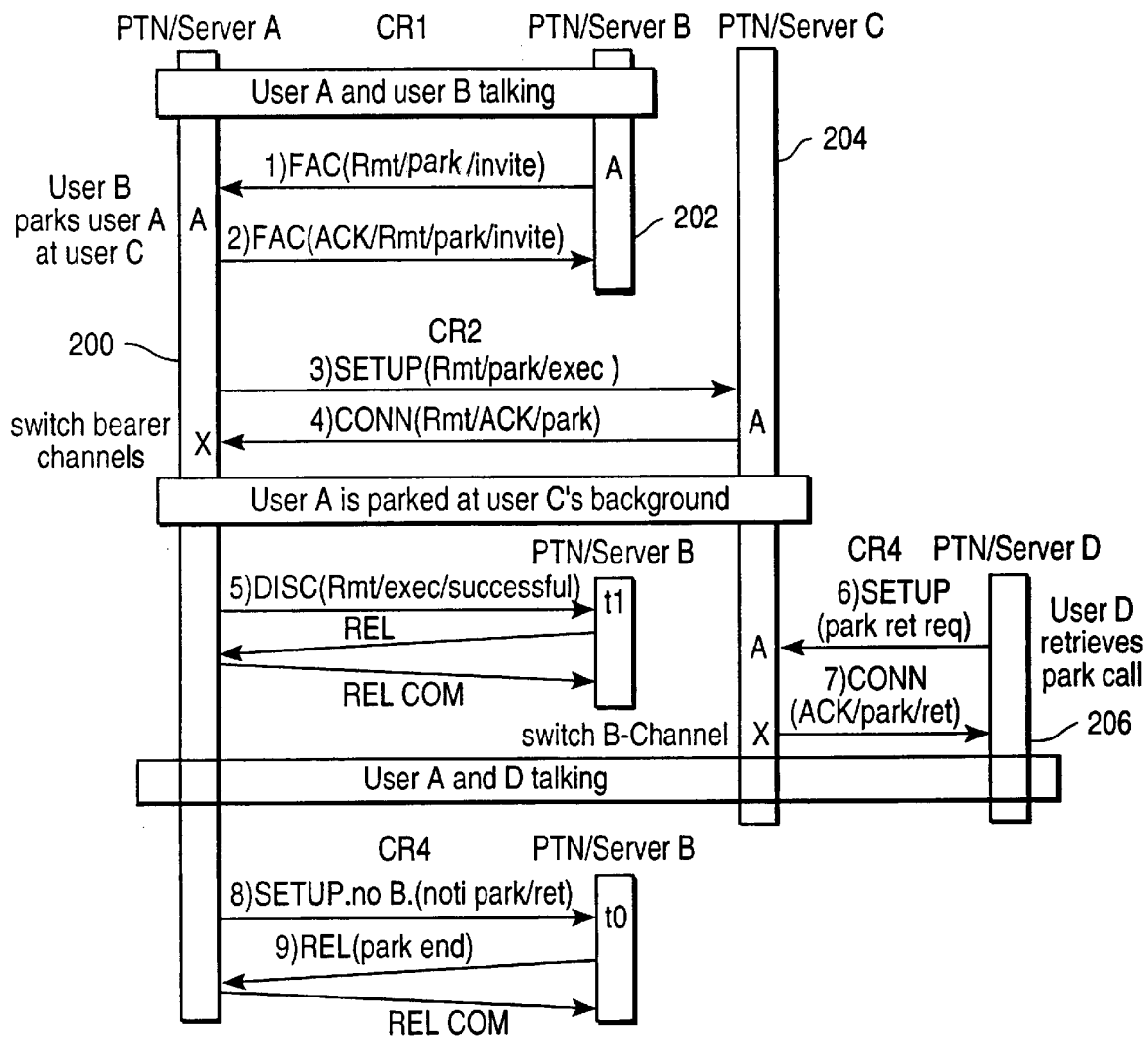
FIG. 9 is a signalling diagram of a particular embodiment of the multi-server call park system illustrating a joining method of operation.
Figure 10:
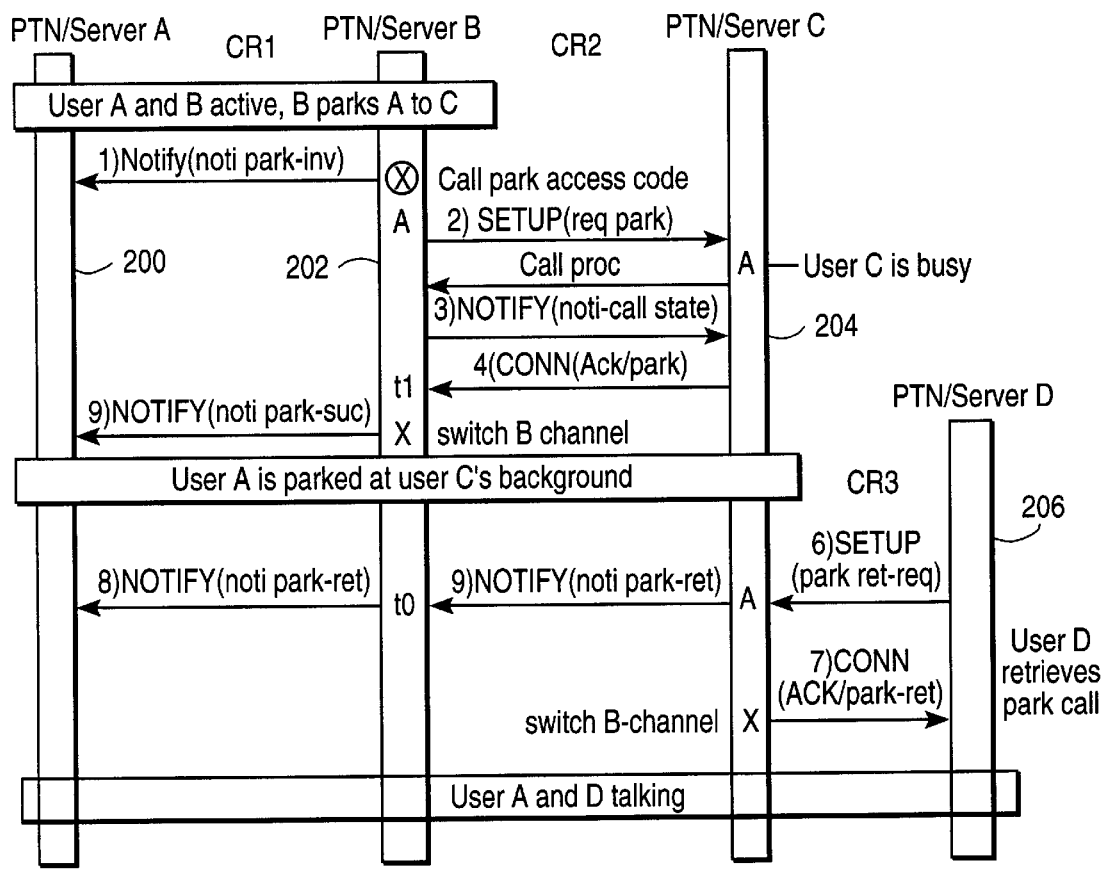
FIG. 10 is a signalling diagram of a particular embodiment of the multi-server call park system illustrating a remote method of operation.

Different embodiments of the invention are described. FIGS. 2, 3 illustrate an exemplary ISDN architecture embodiment. As illustrated in FIG. 8, in an alternate embodiment, the network call parking service in accordance with the present invention is used in a joint ISDN and CSTA/CTI architecture. In another alternate embodiment, as illustrated in FIG. 9, the multi-server network call parking service in accordance with the present invention may be used in an ISDN architecture using a joining mode of operation. In another embodiment, as illustrated in FIG. 10, the multi-server network call parking service in accordance with the present invention may be used in an ISDN architecture using a remote mode of operation.

For a better understanding of the invention, FIG. 1 illustrates a known interconnected network service wherein the entire network includes several interconnected local servers 6, 7, 8, 9 serving local networks 2, 3, 4, 5, respectively. Typically, each local server 6, 7, 8, 9 only controls those supplementary service functions that are local to the networks 2, 3, 4, 5. Local servers have heretofore been unknown to control and cooperatively interwork with supplementary service functions of another remotely located server. The present invention provides special functionality to enable local servers to initiate supplementary service functions for execution on remotely located servers.

Referring to FIG. 2, an exemplary embodiment of a network call park service for an ISDN architecture in accordance with the present invention is generally identified with the reference 100. More particularly, the call park service 100 is shown implemented, for example, on a communication server 12 as a particular supplementary service in a typical network resource feature processing module 118. The feature processing module 118 may also be used to handle other supplementary services. The communication server 12, which may be any known communications server, such as described in U.S. Pat. No. 5,247,670 and hereby incorporated by reference, may include internal standard components, such as prefix logic 110 and digit analysis 112 for receiving, decoding and evaluating number information; applications logic 114 such as CTI, which are described in detail below; a local processing unit 119 for providing user interface aspects of the call park service; and a routing unit 116 for routing a call to its proper destination.

External interfaces to the server may include an incoming trunk 111, such as a primary rate interface (PRI) or Internet line, incoming local traffic 113, such as basic rate interface (BRI) and outgoing traffic 115, such as interfaces for PRI, virtual public (VPN) and private networks, etc.

An API 117 may be used to connect CTI devices (e.g., using TAPI) to the server 12. The outgoing traffic may be routed, among other methods, over asynchronous transfer mode (ATM) or Intra/Internet communication networks. The local processing unit 119 is used to handle call park services within the local server 12, as is done in currently known services.

The incoming/outgoing traffic lines, such as the BRI 113 and PRI 111, interface to device/trunk handlers 121, 122, 123. The trunk handlers 121, 122, 123 interface the server 12 with the external interface 111, 113, 115 which contain the signalling channels. In particular, the handlers 121, 122, 123 operate as translation devices and are able to support various protocol types. This is accomplished through either a standard or proprietary message interface between the handlers 121, 122, 123 and the interfaces 111, 113, 115. As referred to herein, BRI and PRI may be used interchangeably since the invention generally uses the D channels and the associated protocols to receive and transmit messages between communications servers.

For illustration only, D channels are used for all signalling and inter-server communications messages. D channel signalling protocols, known as ISDN User-Network Interface, are specified by the International Telecommunication Union (ITU) Q.930/931 specification. Although some form of signalling data may also be carried by the B channels, by using only the D channels for signalling, the B channels generally remain free to carry communications data. It should be noted that the above description is equally applicable to various other types of signalling interfaces.

Referring to FIG. 3, the call park service 100 is shown in greater detail. As mentioned above, the call park service 100 is responsible for enabling incoming calls to a call recipient to be parked anywhere within the multi-server network. In particular, the call may be parked to a destination's background task and music may be provided while parked, as is done in known call hold services. For example, background parking may include situations wherein: a parked-to destination is busy and the parked call is camped-on to the busy line; when a parked-to destination is idle, the parked call is effectively held on that line; and when parked to a generic server, the parked call is not directly connected to another user, but rather the call is logically parked to a network addressable entity. It should be noted that in the present invention, the parked-to destination may be within the network but outside of the local server and therefore the parked call may be retrieved by any user located anywhere in the network.

A call park service 100 includes an invite request unit 150 that is used for initiating the remote call parking feature by, for example, requesting the other server to park the call. A call park request unit 152 requests a call to be parked at the park destination. A retrieval request unit 154, used in conjunction with the invite request unit 150 and the call park request unit 152, connects a call pickup user with the parked call. A call establishing unit 151 establishes a call to the park destination by the park request unit 152 and retrieval unit 154 (when remote). Optionally, the call parking service 100 may include a notifications unit 153 that provides notification to the system/users of successful or failed call parking, a links release unit 155 to release unused links when the call park type is remote or generic server controlled and the call park was successful and a recall unit 157 to recall the parked call in the event a guard timer in a server (not shown), as discussed below, expires. An optional exception handler 156 to enable the appropriate handling of service or network errors, such as may occur when retrieving a parked call, may also be provided.

In operation, a user may initiate the call park service 100 by pressing the appropriate key and/or digits on a user device, such as a telephone unit. In the server 12 then, the local/remote processing unit 119 processes the input request, the digital analysis unit 112 analyzes the digits and the call park service starts. If an invite request is invoked, then the invite request unit 150 becomes active and determines whether the parking party is local or remote. If remote, an invite_request is sent to the to-be-parked user's server 158 or Application logic 114 and supervised by the system for a return response. If the response is negative, the exception handler 156 handles the condition and the invite_request fails. Alternatively, the inviting server may perform the parking on behalf of the parked user. Otherwise, if a positive response is received, the invite procedure may return to idle state and monitor for further network park activity. Messages that indicate success or failure (e.g. of the invite procedure) sent and/or received from the notifications unit 153 are optional. The invite request may be implemented such that either user/server in the call performs the parking to the park destination.

When a park request is sent, the park request unit 152 becomes active. Depending on the park type (i.e. local/joining, remote or generic server controlled), either a remote or local procedure is followed. The invite request may be implemented such that either user server in the call performs the parking to the park destination. By way of example only, in the case of park_request local, the call establishing unit 151 establishes a call to the park destination. The system then supervises for a return response. If the response is negative, then the recall unit 157 handles the condition and park_request fails. The notification unit 153 may be used to indicate either success or failure. If a positive response is received, the network service is considered successful. The guard timer is started at this time to ensure that a call is not forgotten. In particular, upon expiry of the guard timer, the recall unit 157 recalls the call. However, the guard timer may be stopped if the retrieval request unit 154 requests retrieval of the call, either from a remote or local user.

Figure 4A:
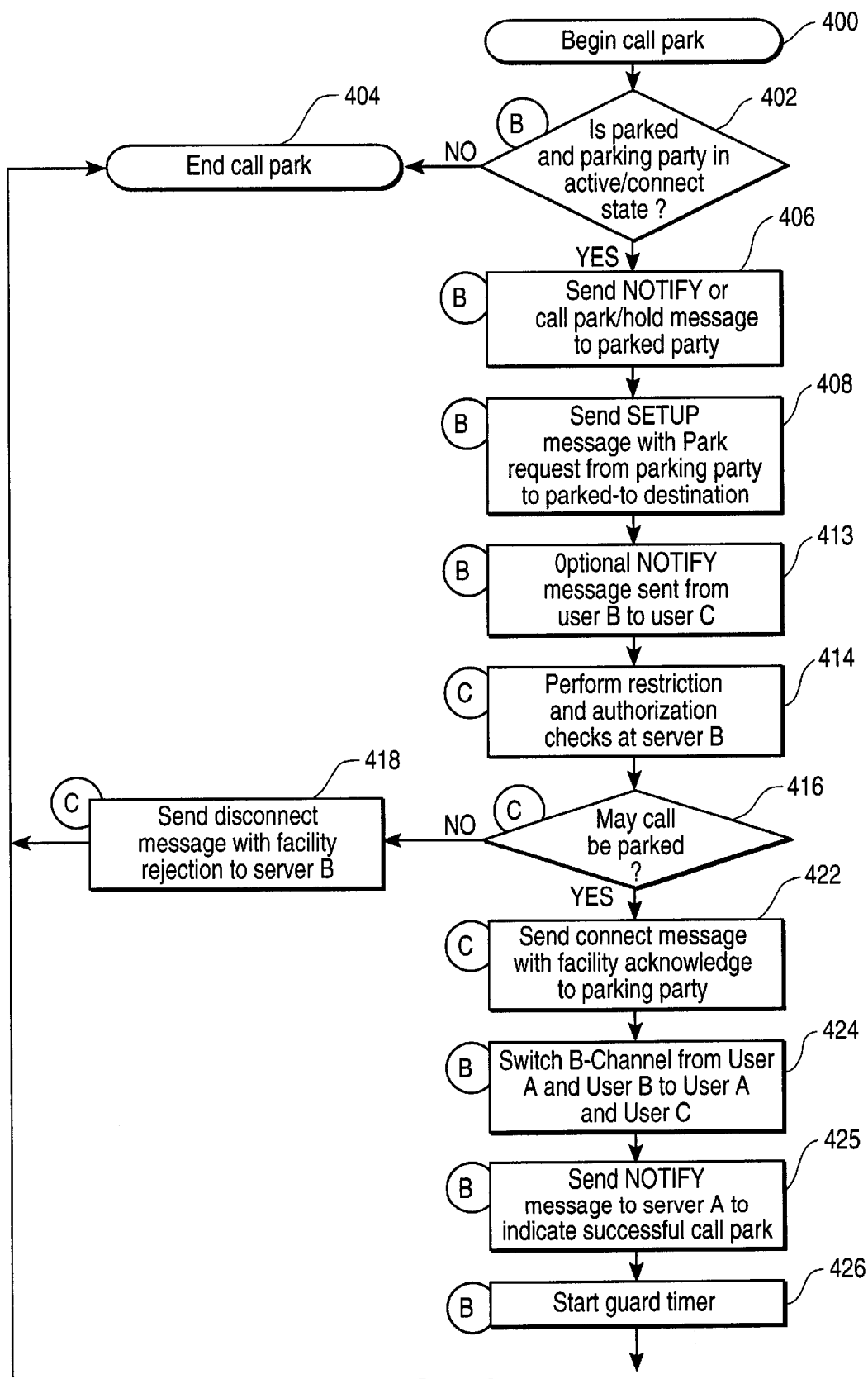
FIGS. 4A and 4B are flow diagrams of the multi-server call parking system in a joining method of operation.
Figure 4B:
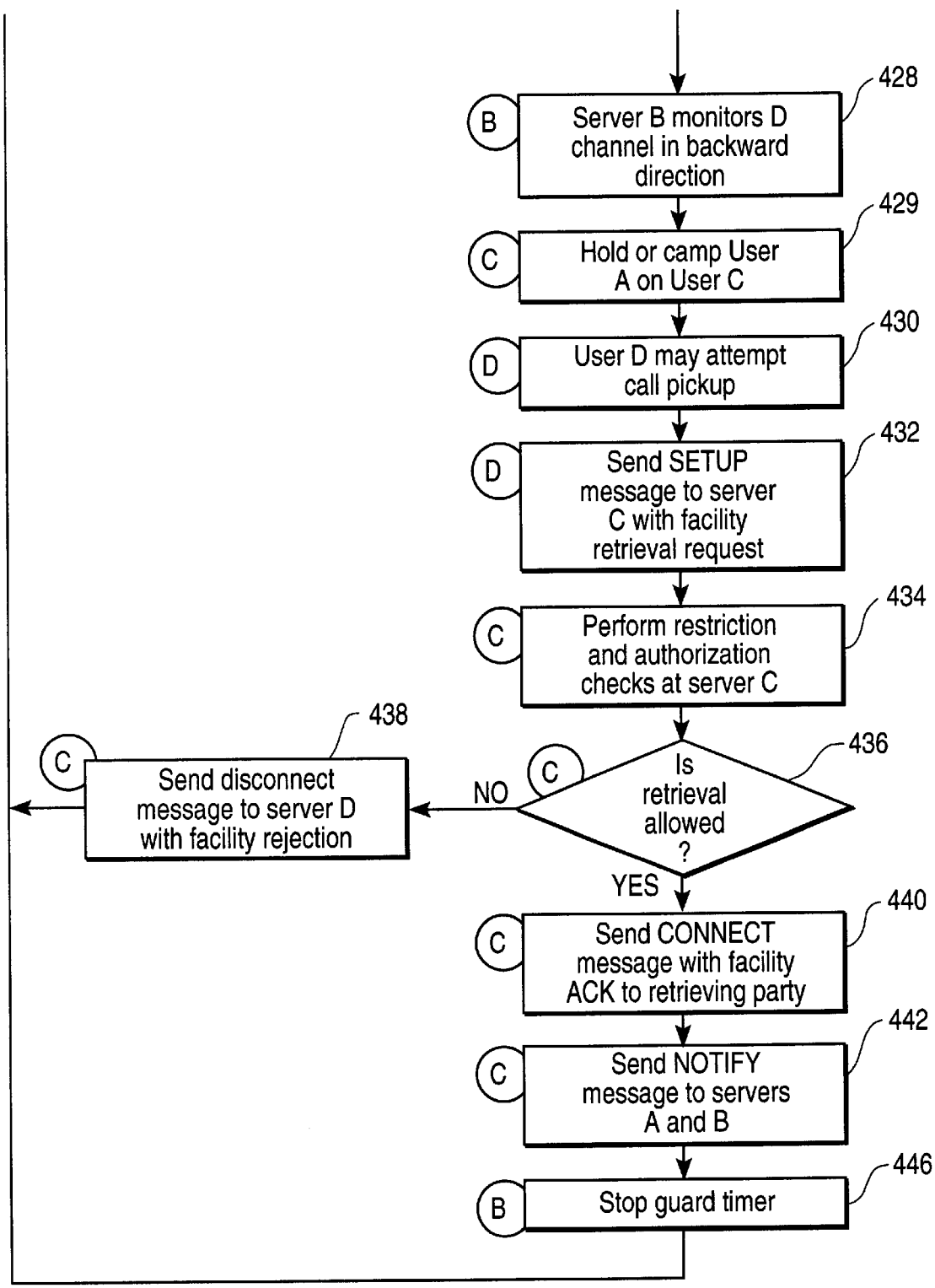

Referring to FIGS. 4A, 4B, 10, an exemplary call park service is shown depicting a successful network park operation in joining mode. In particular, the service is shown in a joining mode wherein the service retains a connection between the parked user 158, the parking user 160, the destination user 162 where the parked party is parked, and the user (not shown) retrieving or picking up the parked call. The retrieving user may be local or remote to the server.

In FIGS. 4A and 4B the server performing each particular function is indicated in an attached circle next to each box. It should be noted that the sequence numbers in FIG. 10, (e.g. "1)"), indicate the order of the steps in which ISDN messages are transmitted and the arrows indicate where the ISDN messages originate and terminate and in which direction the messages are travelling. It should further be noted that references to "facility" notification and messages as used in the present invention implies, but is not limited to, the industry standard ITU Q.932 facility information element (FIE) with remote operation service elements (ROSE) encoding. In addition, each FIE is assigned a particular value, depending upon the functions being performed. ISDN protocols require that each link of a call be assigned a call reference value. For example, as shown, connections between the parked user 158 and the parking user 160 have a call reference value of CR1, calls between the parking user 160 and the park destination user 162 have a call reference value of CR2 and calls between the park destination user 162 and the retrieving user have a call reference value of CR3. ISDN messages use the call reference values to specify the connections at which the commands are to be executed.

In step 400, the call park service is activated through the park request unit 152 (FIG. 3). In step 402, the service determines whether the parked user 158 and the parking user 160 are in an active/connect state. If not, the call park service will end in step 404. If however, the call is in an active connect state, a notify message with "call park", or alternatively "call hold", is sent to the parked user 158 in step 406. In particular, after the parking user 160 has received a call from the parked user 158 and invoked the call parking service, such as through a key press, an ISDN NOTIFY (or FACility) message with facility notification of invocation of network park, or alternatively "call hold", is sent to the parked user 158. The NOTIFY (or FACility) message informs the user of the park/hold facility invocation. The CR has already been assigned. Thus, the parked user 158 is notified that network park has been invoked.

In step 408, a setup message is sent from the parking user 160 to the parked destination user 162. In particular an ISDN SETUP message is sent from the parking user 160 to the park destination user 162. The SETUP message generates a call reference having a value of CR2, a called number information element (IE) having a value of the park destination user, a channel ID IE having a value of B-channel, a facility request having a value of network park request, a calling party number/name IE having the value of the parking user and, optionally, User-to-User (UU) IE carrying the parking user profile (e.g. permissions). Alternatively, instead of sending a Codeset O UU IE, the implementor may shift to a private codeset or extension to send this information.

In step 413, a NOTIFY message may be sent from the parking user 160 to the park destination 162. In particular an optional ISDN NOTIFY (or FACility) message, which may be sent in both directions, is sent between the parking user 160 to the park destination user 162. The NOTIFY (or FACility) message includes an FIE facility request having the value Call State Notification/active, and connected number/name IE having the value of the parked user and an optional UU IE carrying the parked user profile. This allows a server C 204 to perform restriction checks between the parked user 158 and the parked destination user 162. In step 414, restriction and authorization checks at the server C 204 and/or at the server B 202 may be performed. If the checks are positive, in step 416 the call may be parked. If the call may not be parked, then in step 418, a disconnect message is sent and in step 404 call park is ended.

In step 422, a connect message is sent to the parking user 160. In particular, an ISDN CONNECT message is sent from the park destination 162 to the parking user 160. The CONNECT message includes an FIE facility return having a value of ACKnowledge/network park, a connected number/name IE having a value of the park destination and, optionally, a UU IE carrying the park destination user profile. The B channel is switched (i.e. joined) from the parking user 160 to the parked destination 158 and the call is through-connected. If the connect is not allowed, the server C 204 clears the call by sending a Disconnect message with cause code, and the call park service is rejected.

A NOTIFY (or FACility) message in step 425 is sent to the parked user 158 and includes a call reference IE with the value CR1, an FIE facility request response with the value Network Park-successful, a connected number/name IE having the value of the park destination 162 and an optional UU IE carrying the park destination profile. In step 426, the guard timer is started at the server B 202. In particular, a timer (t1), which may be an internal or administrable timer of a pre-determined time interval, is started at the time that the parked user 158 is placed on hold. If the parked user 158 is not retrieved by the time of t1 expiry, the caller is recalled to the call parking user 160. Referring to FIG. 4B, in step 428, the server B 202 monitors the D channel in the backward direction for retrieval notification. In step 429, the parked user 158 is held or camped-on the park destination. Typically the parked user 158 will be held if the park destination 162 is idle or camped-on if the destination 162 is busy. Providing music is a local option.

In Step 430, the retrieving user may attempt to pick up the parked call which will cause a setup message, in step 432, to be sent to the park destination 162. In particular, an ISDN SETUP message is sent from the retrieving user to the park destination. The SETUP message generates a call reference IE having a value of CR3, a called number IE having a value of the park destination user 162, a channel ID IE having a value of CR3, channel ID IE of B-channel, an FIE facility request having a value of network park-retrieval or call pickup, a calling party number/name IE having the value of the retrieving user and an optional UU IE carrying the retrieving user profile. In step 434, restriction and authorization checks are optionally performed at the server C 204. In step 436, the service determines whether retrieval of the parked call is allowed. If retrieval is not allowed, a disconnect message is sent to a server D 206 in step 438.

If retrieval is allowed, then in step 440, a connect message is sent to the retrieving user. In particular, an ISDN CONNECT message is sent from the park destination 162 to the retrieving user. The CONNECT message includes an FIE facility return having a value of ACKnowledge/network park retrieval, a connected number/name IE having a value of the parked user 158 and an optional UU IE carrying the parked user profile. The B channel is switched (i.e. joined) between the park destination 162 and the retrieving user by the server C 204 (parked destination timeslot has parked user in the background), thereby connecting the parked user to the retrieving user.

In step 442, a notify message is sent to a servers A 200 and the server B 202 informs the users A 200 and B 202 of the retrieval. In particular, an ISDN NOTIFY (or FACility) message is sent from the park destination 162 to the parking user 160 and from the parking user 162 to the parked user 158. The NOTIFY (or FACility) message includes an FIE facility request having the value Network Park Retrieval or call pickup, a connected number/name IE having the value of the retrieving user and an optional UU IE carrying the retrieving user profile. Once the facility notification message has been received, the guard timer running at the server B 202 is stopped in step 446.

Referring to FIG. 9, an exemplary call park service is shown depicting a successful network park in a remote mode. In particular, the service is shown in a remote mode of operation wherein the fewest number of links possible between the parked user 158, the parking user 160, the park destination user 162 and the retrieving user are used. Such a service enables conservation of links by releasing one or more links between the parked user 158 and the parking user 160.

Figure 5A:
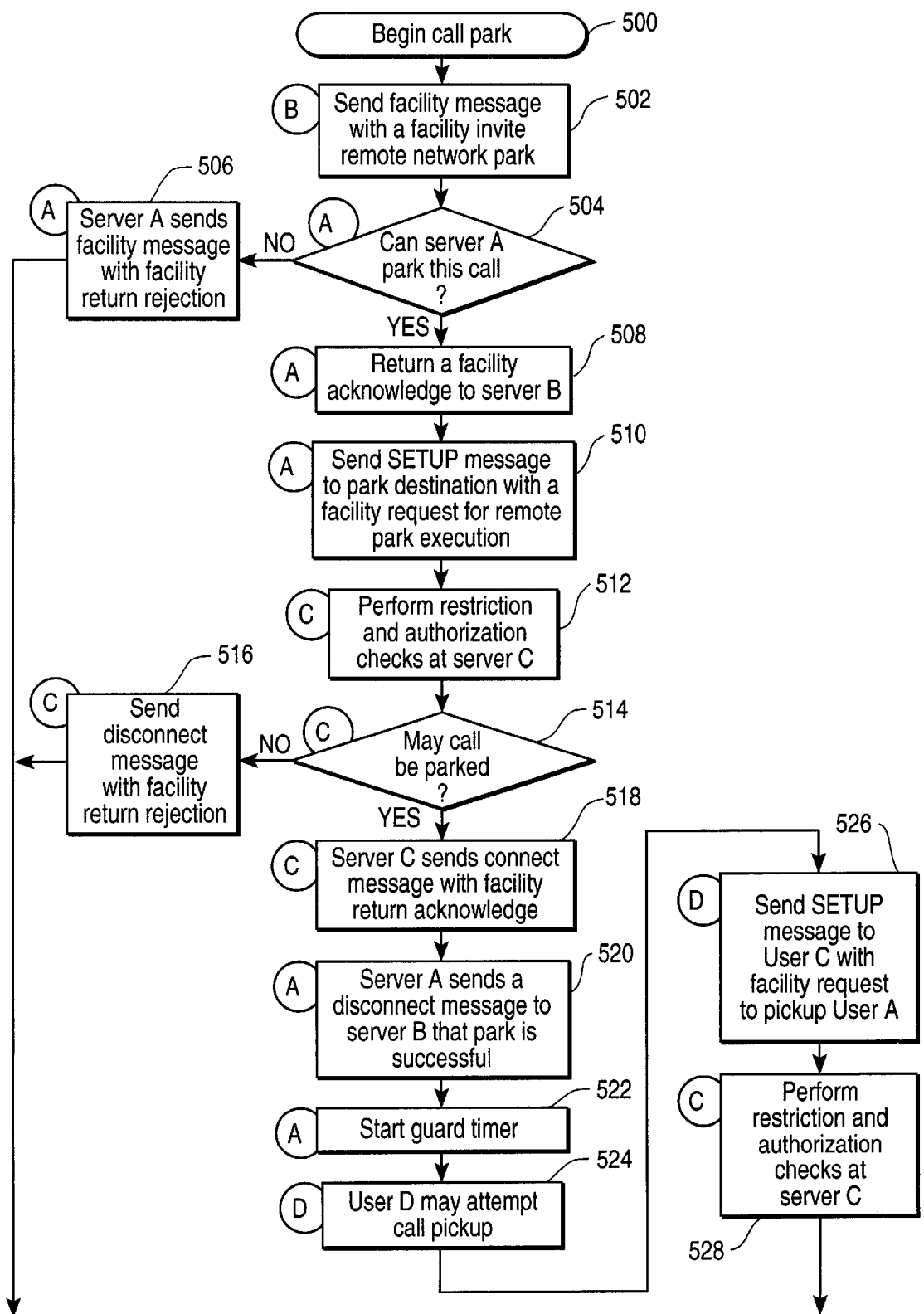
FIGS. 5A and 5B are flow diagrams of the multi-server call parking system in a remote method of operation.
Figure 5B:
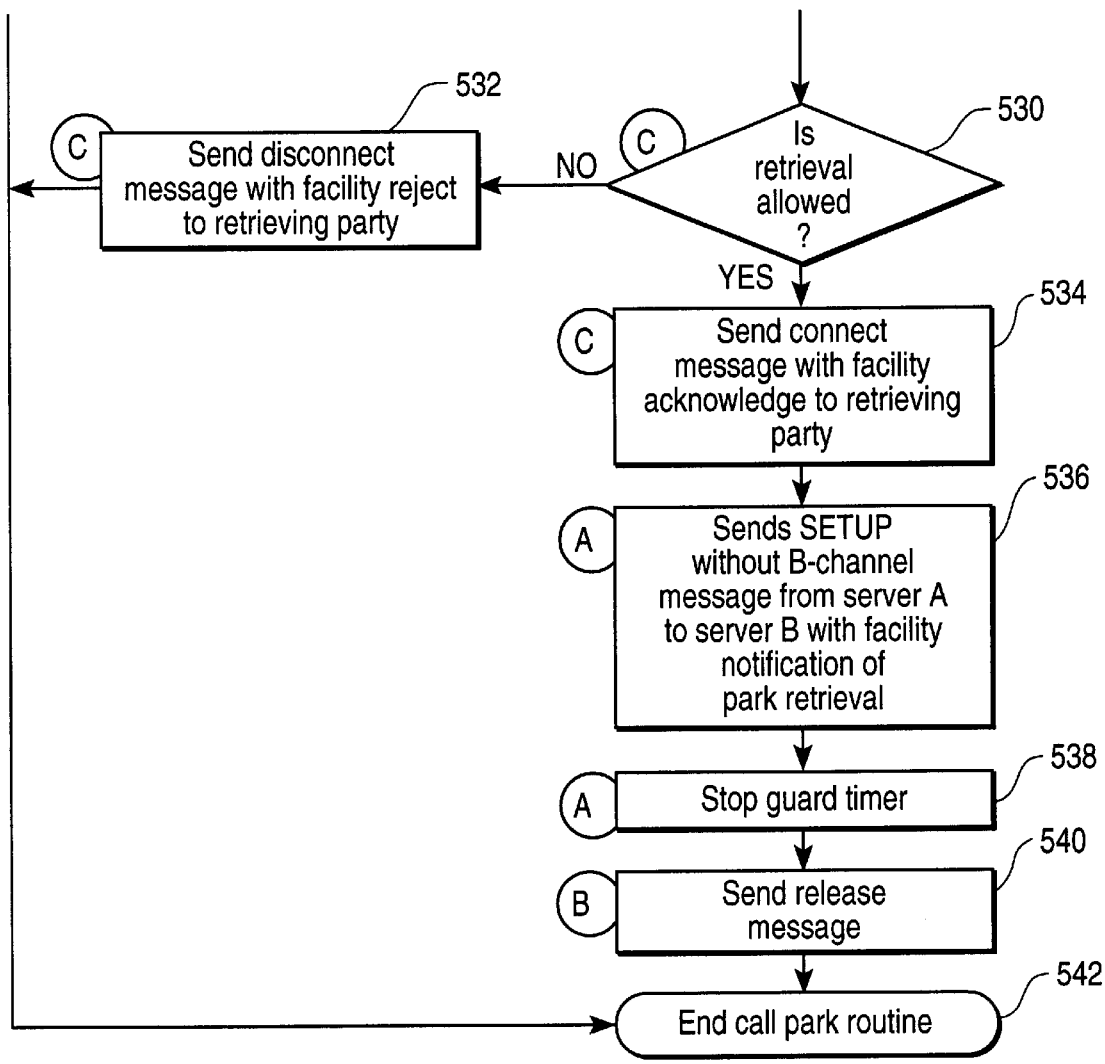

Referring to FIGS. 5A, 5B, 9, operation of the call parking service is shown in a conservation of links procedure. In FIGS. 5A and 5B the server performing each particular function is indicated in an attached circle next to each box.

In step 500, the user at the parking user 160 invokes network park via access code menu or key with a park destination number. In step 502, a facility request message to invite the parked user 158 to park is sent to the server A 200. In particular, after the parking user 160 has invoked the call parking service, an ISDN FACILITY message is sent from the parking user to the parked user. The FACILITY message includes an FIE facility invite having the value of remote network park/destination number. Thus, the parked user's server is requested to execute network park. In step 504, the server A 200 either rejects the request or agrees to attempt the remote network park. If the server A 200 does not accept the invite message, a facility message is sent in step 506 and the call park invite request is rejected.

However, in step 508, if the server A 200 accepts the invite request, a positive acknowledge is sent to the server B 202. In particular, an ISDN FACILITY message is sent from the parked server 158 to the parking user 160. The FACILITY message includes an FIE facility return having the value of acknowledge/remote network park/invite. In this manner, the parked user 158 is notified that network park has been invoked and sends an acknowledgment to the parking user 160. The parked user 158 may be provided locally with music or silence (i.e., the timeslot to the parking user 160 is closed).

In step 510, the server A 200 sends a setup message to the park destination 162 with a request for remote park. In particular, an ISDN SETUP message is sent from the parked user 158 to the park destination user 162. The SETUP message generates a call reference IE having a value of CR2, a called number IE having a value of the park destination, a channel ID IE having a value of B-channel, a facility request having a value of remote network park request, a calling party number/name IE having the value of the parked user, a redirecting party number/name IE having a value of the parking user, and an optional UU message carrying the parked user's profile.

In step 512, the server C 204 upon receiving the setup message, may perform restriction and authorization checks before responding. In step 514, the server C 204 determines whether the call may be parked. If it is determined that the call may not be parked, then in step 516 a disconnect message is returned with facility return rejection. If the call may be parked, the server C 204 sends a connect message in step 518. In particular, an ISDN CONNECT message is sent from the park destination 162 to the parked user 158. The CONNECT message includes an FIE facility return having a value of ACKnowledge/remote network park/request, a connected number/name IE having a value of the park destination and an optional UU IE carrying the park destination user profile. The B channel is switched at the server A 200 from the parked and parking user's timeslots to the parked and park destination timeslots at this time.

In step 520, the server A 200 sends a disconnect message to the server B 202 with an acknowledge notification indicating that the remote network park was successful and that the connection is cleared. In particular, an ISDN DISCONNECT message is sent from the parked user to the parking user. The DISCONNECT message includes an FIE facility request having the value Remote Network Park-successful and a cause IE having a value of normal call clearing.

In step 522, the guard timer is started. The recall guard timer may be implemented in the Server A 200 rather than the Server B 202, since the parked user 158 is already connected to the parked destination 162 background. The park recall function is responsible for re-establishing a bearer channel between the parked user 158 and the parking user 160 if the timer expires. In step 524, the park destination user 162 may attempt to retrieve the parked call. Accordingly, in step 526, a setup message is sent to the park destination 162 with a request to retrieve park or, alternatively, network pickup the parked user 158. In particular, an ISDN SETUP message is sent from the retrieving user to the park destination 162. The SETUP message generates a call reference IE having a value of CR3, a called number IE having a value of the park destination, a channel ID IE having a value of B-channel, a facility request having a value of-remote network park retrieval, a calling party number/name IE having the value of the retrieving user and an optional UU IE carrying the retrieving user profile. It should be noted that the retrieving user and the parking or park destination may be the same.

In step 528, the server C 204 may perform restriction and authorization checks. In particular, referring to FIG. 5B, in step 530, the server C will determine whether retrieval is allowed based on the restriction and authorization checks. If retrieval is not allowed, then in step 532 a disconnect message is sent to the retrieving user. If, however, call retrieval is allowed, then in step 534 a connect message is sent to the retrieving party at the server D 206. In particular, an ISDN CONNECT message is sent from the park destination user 162 to the retrieving user. The CONNECT message includes an FIE facility return message having a value of ACKnowledge/remote network park retrieval, a connected number/name IE having a value of the parked user and an optional UU IE carrying the parked user's profile at the Server C 204. The B channel is switched at the server C 204 between the parked user 158 (at the park destination user background) and the retrieving user 160 at this time also, thereby connecting the call.

After successful retrieval, in step 536, the server A 200 sends a setup message without B channel (i.e. temporary signalling connection) message with notification of park retrieval success to the server B 202. In particular, an ISDN SETUP message is sent from the parked user's server 158 to the parking user 160. The SETUP message generates a call reference IE having a value of CR4, a called number IE having a value of the parking user, a channel ID IE having a value of no B-channel, an FIE facility request having a value of remote network park retrieval notification, a calling party number/name IE having the value of the parked user, a redirection number/name IE having a value of the retrieval user or, alternatively, the value of the park destination user and an optional UU IE carrying the parked user's profile.

In step 538, the guard timer is stopped. Alternatively, the timer may be stopped immediately during step 534. In step 540, a release message is sent to the server A 200. In particular, an ISDN RELEASE message is sent from the parking user 160 to the parked user 158. The RELEASE message includes an IE cause message having the value of normal call clearing and an optional FIE facility return message having the value remote network park retrieval acknowledge. This FIE signalling is optional. However, if the timer expires before the retrieving user has retrieved the parked call, the server A 200 shall perform a SETUP with FIE call park recall request facility to the parking user 160 to re-establish a connection to the parking user 160 and initiate the park recall service. The server A 200 shall cut-through the parked user 158 to the parking user 160 connection and disconnect the connection to the park destination 162. Cut through, which may also be referred to as switching from one circuit to another, as used herein, is the act of connecting one circuit to another. This results in a two-may or multi-way connection.

Referring now to FIG. 8, an embodiment of the call park service in a mixed ISDN/CSTA/CTI solution is shown wherein a server may act as a third party or group services. The call park service, as will be discussed in more detail below, includes a generic server (GS) 800 and one or more PTN/Servers 802, 815, 817, 819 having one or more clients 820, 822, 824, 826, respectively. The GS 800 includes operation information, which may be stored in a database (not shown) by which the GS 800 is able to coordinate the execution of the call park feature, the API 804, a network directory 806, a service processor 808 and the client profiles 810. Similarly, each of the PTN/Servers include a service processor 812, an application control link 814 and an API 816.

In a first interface, the GS 800 is connected to each of the PTN/Servers 802, 815, 817, 819 (i.e. implementation dependant) either directly through the LAN lines/CTI link 801, TCP/IP (not shown) or via tandem PTN/X/Servers (not shown). The generic server API 804 connects to the PTN/Server API 816 to complete the connection, thereby enabling generic server to PTN/Server communication. In a second interface, each of the PTN/Servers is interconnected, for example, via ISDN lines 803. Thus, the mixed ISDN/CSTA/CTI based embodiment of the present invention enables a parking client to park a call to another client via a physical ISDN connection between the client A 820 and the client C 824 and/or enables the parking client to park a call to the GS 800 via a logical connection (without a physical connection, but having a network address) between the client A 820 and the GS 800. Because of the mixed environment, much of the signalling found in an ISDN only solution is performed by the servers and their respective service processors, thereby substantially reducing the amount of ISDN D channel signalling and conserving links (e.g. B-channels) in the network. Furthermore, as a client invocation option when parking to another client, the present invention may be invoked without establishing a B channel connection. In such instances, a temporary signalling connection (TSC) is established. B channel connection may be established, if desired, when the call is retrieved.

FIG. 8 is a CTI network configuration model where mixed signalling occurs. Voice, data, video, media streams, etc. are carried on one or more types of communication facilities (e.g., ISDN over TCP/IP) with associated signalling (e.g., Q930/931) while the applications running on servers may provide call control and network services via signalling over a CTI link. In a particular embodiment, applications, such as local and networked, are distributed, but shared, amongst the servers and serve the general network population/subscribers and resources. The embodiment applies to network park services as described in FIGS. 6A, 6B and 7. CTI monitoring events in other servers, which may be remote from where the network service resides, provide the input to the GS 800 (e.g., park invocation via button press type event) where the network park service can act on these events. Monitoring points (e.g., devices, buttons) are setup by the GS 800 for the network park service, but are not further discussed since it is dependent on the implementor's environment.

Figure 6A:
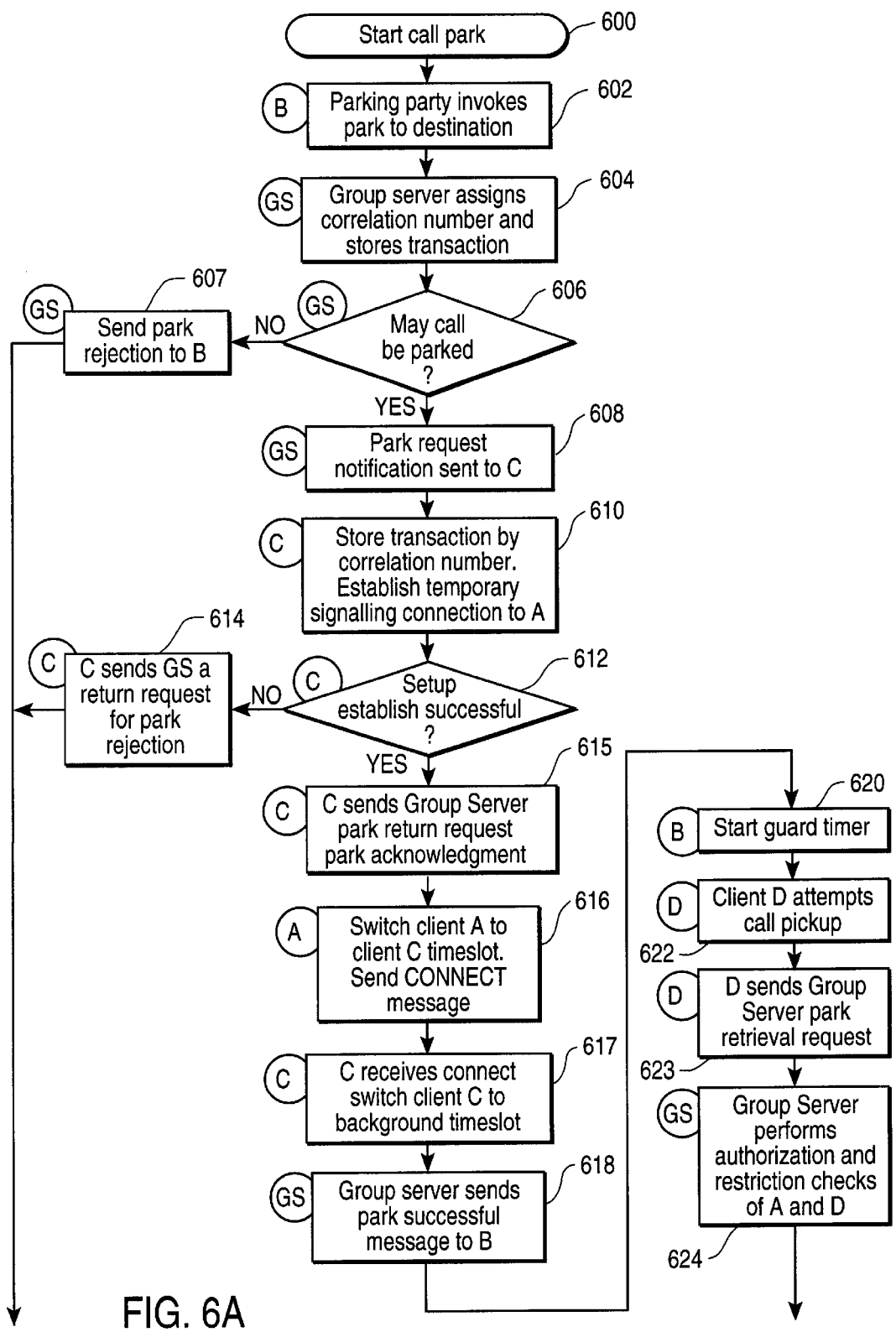
FIGS. 6A and 6B are flow diagrams of the multi-server call parking system in a client/server method of operation.
Figure 6B:
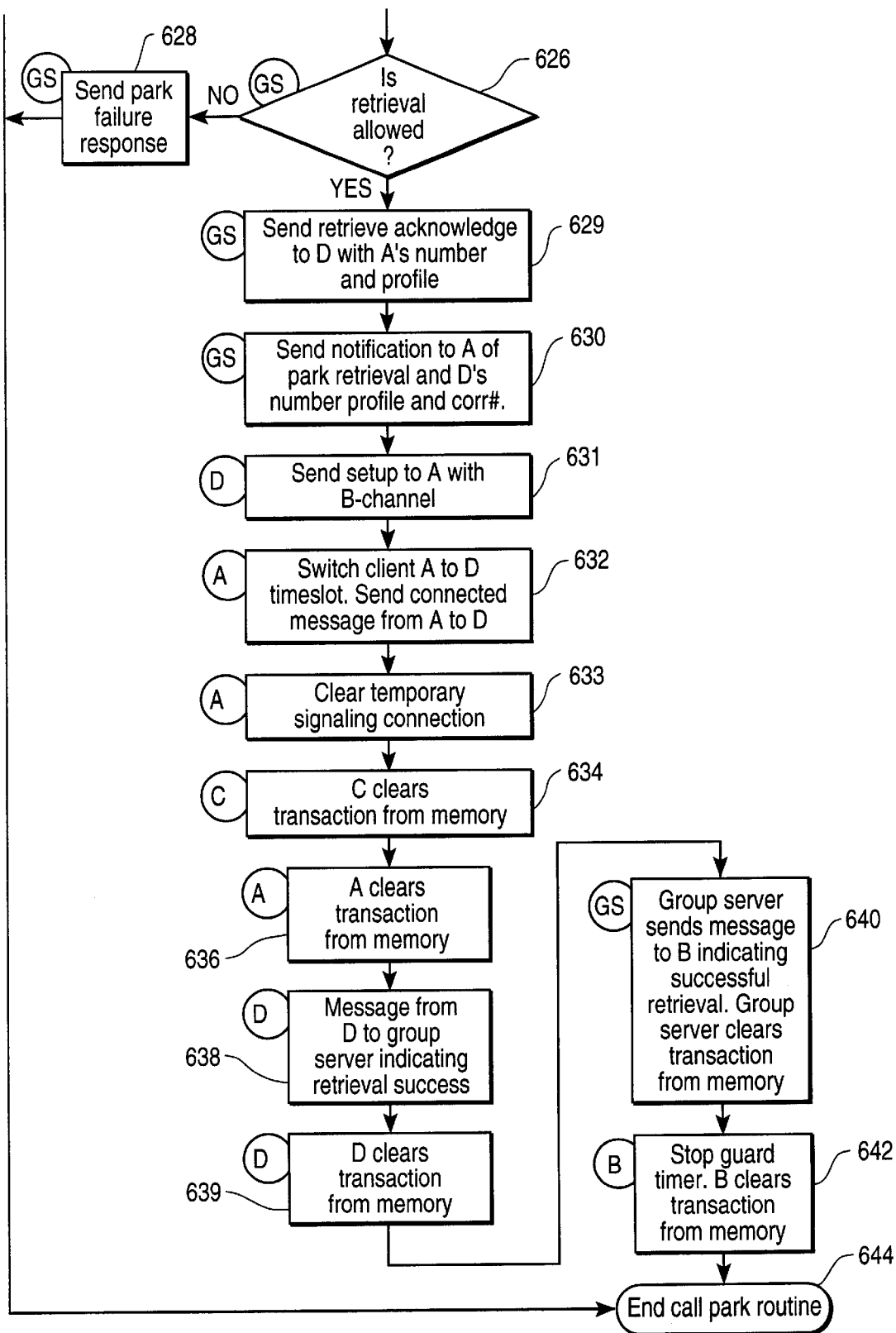

Referring to FIGS. 6A, 6B, 8, the call parking service is shown in an ISDN/CSTA/CTI mode of operation wherein the service enables the parking client to park a call to another client. In FIGS. 6A and 6B the server performing each particular function is indicated in an attached circle. It should be noted that many of the signalling messages flow along the LAN interface connections and other signals flow through the ISDN connections, as described below. Furthermore, correlation numbers (e.g. call ID) are provided as network-wide unique transaction identifiers. The correlation numbers are necessary for the GS 800 and each server 802, 815, 817, 819 to correlate each of the transactions to one call. Alternatively, call IDs and/or device IDs may be used to identify the call.

As shown, in step 602, the client B 822 invokes park to destination at the client C 824 which results in a park service request being sent to the GS 800. In particular, a LAN message is sent from the client B 822 to the GS 800 having the park call request, destination=client C's number, client A's number and profile and client B's number and profile.

In step 604, the GS 800 assigns a correlation number and stores the transaction by correlation number and/or Call ID. In step 606, the service determines, based on local data, whether the call may be parked. The GS 800 performs restriction/authorization checks using the static profile of the client C 824 and the dynamic/static profiles of the client A 820 and the client B 822. If the call may not be parked, then in step 607, a park rejection response is sent to the server B 822. However, if it is determined that the call may be parked, then in step 608, a park request response positive ACK is sent to the client C 824. In particular, a LAN interface redirect message is sent from the GS 800 to the client C 824. The request has the parameters park request, destination= client C's number, client A's number, client A's profile, correlation number and call ID. Client B's number and profile may also be sent. Response signalling from the server C 817 is optional.

In step 610, client C 824 stores the transaction by correlation number and establishes a TSC to client A 820. In particular, an ISDN setup message is sent from the client C 824 to the client A 820. The setup message generates a call reference IE having the values FIE park execution and the correlation number, client C's number, client C's profile, and channel ID IE having the value of no B channel. In step 612, it is determined whether the setup of the signalling connection failed. If so, then in step 614, the client C 824 sends the GS 800 a return negative response for park failure and the service terminates.

If the setup is successful, the client C 824 sends the GS 800 a return positive response that the park was successful in step 615. In step 616, the Server A 802 receives the setup message, stores the correlation number, switches the server A 802 to the client C 824 time slot and sends a connect message to the client C 824. The connect message includes an FIE of park execution, client A's correlation number and an FIE facility return message having the value of acknowledge. An optional UU message carrying client A's number and profile may also be sent. Alternatively, shift to a private codeset or other escape mechanism may be used.

In step 617, the client C 824 receives the connect message and switches the client C's background to the client A's timeslot. Request for park acknowledgement is sent to the GS 800. Timeslots can be reserved or logical (fictitious) depending on the implementor's choice. In particular, an ISDN connect message is sent from the client A 820 to the client C 824. In addition, a LAN message is also sent from the client C 824 to the GS 800 with a park state event, correlation number, Call ID and park successful.

In step 618, the GS 800 receives the park successful message and reports it to the client B 822. In particular, a LAN message is sent from the GS 800 to the client B 822 with park state event, correlation number, Call ID and park successful. Upon receiving the message from the GS 800, the client B 822 starts a guard timer (t1) in step 620.

In step 622, the client D 826 attempts to retrieve the parked call. In particular, in step 623, a LAN redirect message is sent from the client D 826 to the GS 800 with park retrieve request and the client C's number. The client D's number and profile may also be sent to the GS 800.

In step 624, the GS 800 performs a check using dynamic profiles of the client A 820 and the client D 826. If retrieval is not allowed in step 626, then a negative response with park failure is sent to the client D 826 in step 628. In particular, the GS 800 sends a LAN message to the client D 826 having values of retrieve park failure. If retrieval is allowed, then in step 629, the GS 800 will send park retrieve acknowledgement to the client D 826 with A's number, correlation number, call ID, and profile. In particular, the GS 800 sends a LAN message to the client D 826 having values of park retrieve positive acknowledgement with associated parameters. In step 630, the GS 800 informs the client A 820 that park retrieval is in progress. In particular, the GS 800 sends a LAN message to the client A 820 having values of park retrieve notification and the client D's number with associated parameters. The client D's server 819, upon receipt of the message sent in step 629, sends a SETUP message to the client A 820 with B-channel (and associated parameters) as shown in step 631. The setup message generates a call reference IE, correlation number, call ID, and FIE facility request having the value of park retrieval, a channel ID IE having the value of B channel and an optional UU message (alternatively, escape to private codeset) carrying the client D's profile.

In step 632, the client A 820, upon receiving the setup with correlation number, switches the client A 820 to the client D's timeslot and sends a connect message to the client D 826. In particular, an ISDN connect message is sent from the client A 820 to the client D 826 with an FIE facility return of park retrieve positive acknowledgement and associated parameters.

In step 633, the client A 820 clears the TSC to the client C 824. In particular, an ISDN release message is sent from the client A 820 to the client C 824. The release message includes call IE having the value of normal call clearing. In step 634, the client C 824 clears the transaction from its memory. In step 636 the client A 820 clears the transaction from its memory. The transaction data may be retained for the life of the call in all cases, but is shown here by way of example only, since memory does not need to be maintained for this transaction when the call disconnects.

In step 638, the client D 826 receives the connect message and reports retrieval successful to the GS 800. In particular, the client D 826 sends a LAN message to the GS 800 having park retrieve state-connected successful, and the correlation number of client D. In step 639, the server D 819 may clear the transaction from memory. In step 640, the GS 800 upon receiving the retrieval successful event, indicates retrieval successful to the client B 822 and clears the transaction from memory. In particular, a LAN message is sent from the client B 822 to the GS 800 with park retrieve state-connected successful and the correlation number.

In step 642, the guard timer is stopped and the client B 822 clears the transaction from its memory.

Figure 7A:
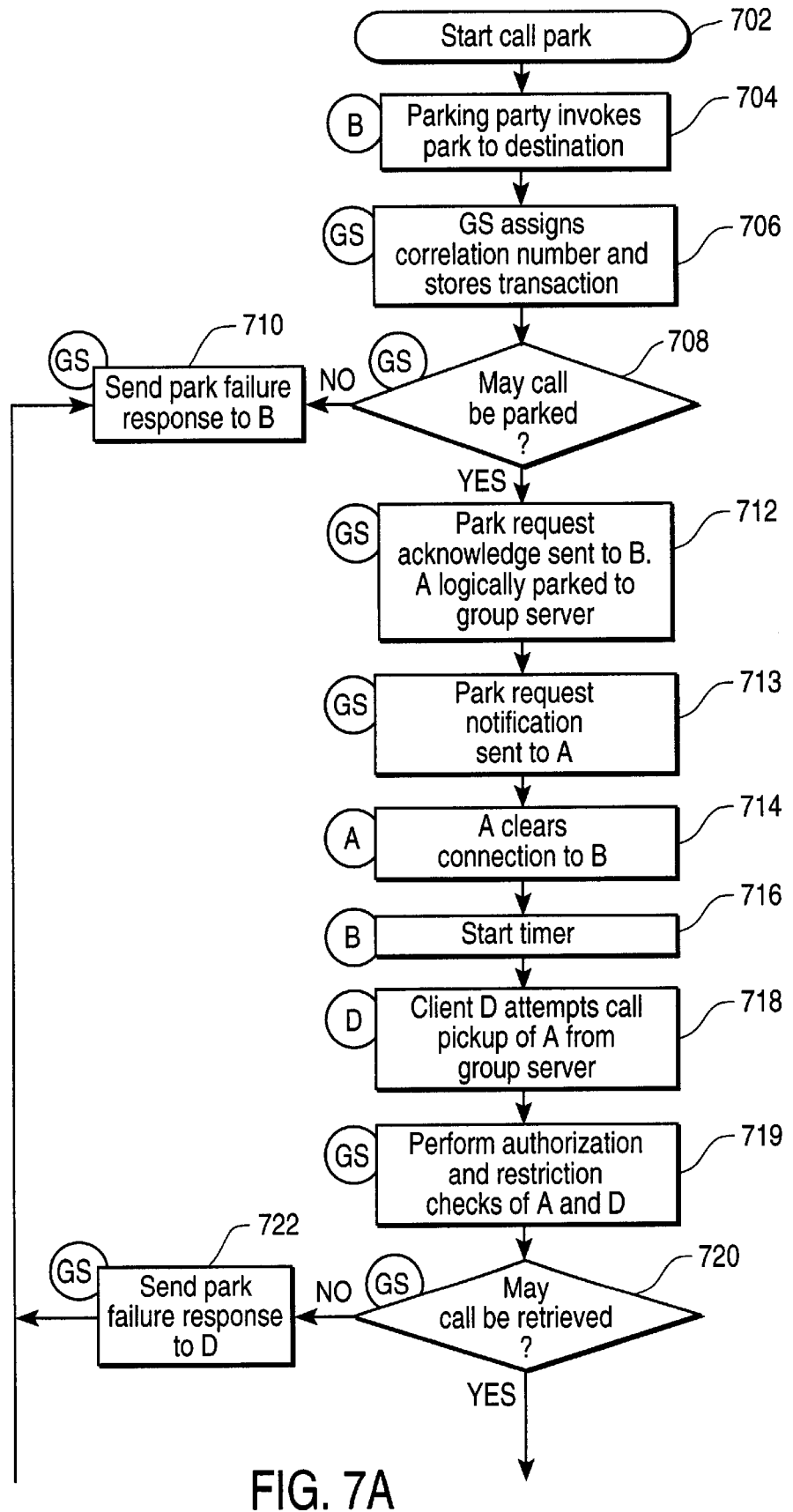
FIGS. 7A and 7B are flow diagrams of the multi-server call parking system in a mixed ISDN and client/server method of operation wherein the call is parked to a generic server.
Figure 7B:
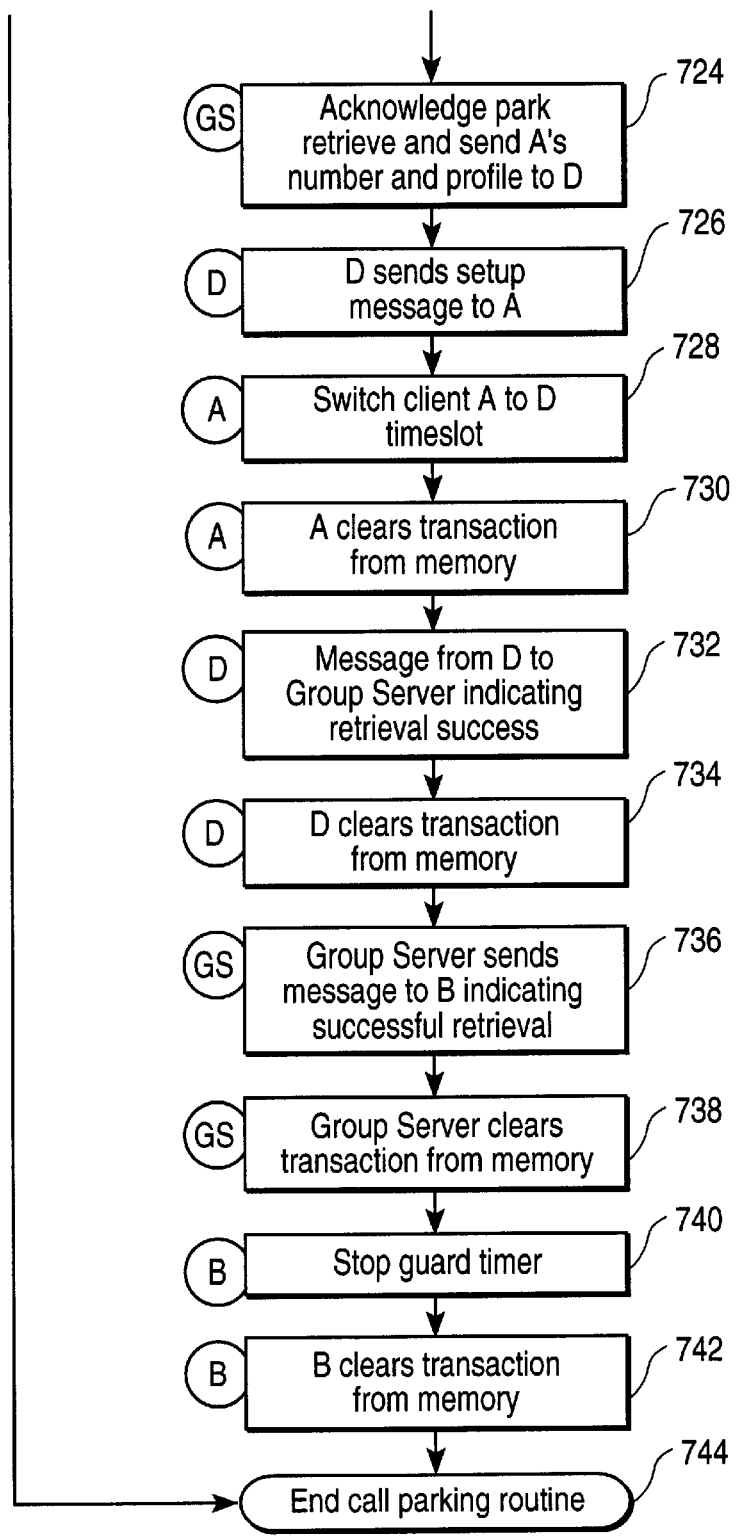

Referring to FIGS. 7A, 7B, 8, the call park service is shown in an ISDN/CSTA/CTI environment in a mode of operation wherein the service enables virtual parking of the client to the GS 800. It should be noted that correlation numbers, call ID, as explained above, are also required in this particular embodiment. In FIGS. 7A and 7B, the server performing each particular function is indicated in an attached circle.

As shown, in step 704, the parking party invokes park to destination GS which results in a park service request being sent to the GS 800. In particular, a LAN message is sent from the client B 822 to the GS 800 with a park call request, destination=generic server, client A's number, and profile and client B's number and profile.

In step 706, the GS 800 assigns a correlation number, or alternatively, a call ID and stores the transaction by correlation number. The GS 800 then performs restriction and authorization checks using the static profile of the client C 824 and dynamic and static profiles of the client A 820 and the client B 822. In step 708, the service determines whether the call may be parked. If the call may not be parked, then in step 710 a response with negative ACK park failure is sent to the server B 815. However, if it is determined that the call may be parked, then in step 712 a park request response positive acknowledge is sent to the client B 822. The client A 820 is logically parked to the GS 800. In particular, a LAN message is sent from the GS 800 to the client B 815. The LAN message includes the park request response acknowledge, call ID and the correlation number for the client B 822. In step 713, a LAN message is sent from the GS 800 to the client A 820 with park request execution successful, and the correlation number, call ID and client B's associated data.

In step 714, the client A 820 receives the park execution message, clears the connection to client B 822 and transitions to a park state. This results in a normal call clearing occurrence. In particular, an ISDN disconnect message is sent from the client A 820 to the client B 822.

In step 716, the client B 822 receives park execution/ successful and starts a guard timer (t1) for recall purposes.

In step 718, the client D 826 attempts to pick up the parked party. In particular, a monitor event is sent to the GS 800 with retrieval request GS. In step 719, upon receiving the retrieval request, the GS 800 performs checks using dynamic profiles of the client A 820 and the client D 826 in an attempt to allow the client D 826 to pickup the client A 820 from the GS 800. If it is determined in step 720 that the call may not be retrieved, a LAN message with park request failure is sent to the client D 826 in step 722. However, if the call may be retrieved, then in step 724 the GS 800 sends a park retrieve positive acknowledge and client A's number and profile to the client D 826. In particular, a LAN message is sent from the GS 800 to the client D 826, including park retrieve response, positive acknowledge, the correlation number and the client A's number and profile.

In step 726, the client D 826 receives the retrieve acknowledge response and establishes a call to the client A 820. In particular, an ISDN setup message is sent from the client D 826 to the client A 820. The setup message generates a call reference IE, FIE park retrieval request, call ID or the correlation number, a calling party number/name IE of the client D 826, a channel ID IE having the value of B-channel and an optional UU message (alternatively, shift to private codeset) carrying the client D's profile.

In step 728, the client A 820 receives the setup message with correlation number, call ID, switches the client A 820 to the client D 826 timeslot and sends a connect message to the client D 826. In particular, an ISDN connect message is sent from the client A 820 to the client D 826. The connect message includes the value of the correlation number, call ID, a facility return message having the value of acknowledge/park retrieve, a connected party number/name IE having the value of client A and an optional UU message carrying client A's number and profile.

In step 730, the client A 820 clears the transaction from its memory. The transaction data may be retained for the life of the call in all cases, but is shown here for illustration purposes only since memory does not need to be maintained for the transaction when the call disconnects.

In step 732, the client D 826 receives the connect message and reports retrieval success to the GS 800. In particular, a LAN message is sent from the client D 826 to the GS 800 with the park response, retrieve successful, call ID and the correlation number.

In step 734, client D 826 clears the transaction from its memory.

In step 736, the GS 800 receives the retrieval success message and indicates retrieval success to the client B 822. In particular, a LAN message is sent from the GS 800 to the client B 822 with park, retrieve successful and the correlation number.

In step 738 the GS 800 clears the transaction from its memory. The guard timer is stopped in step 740. In step 742, the client B 822 clears the transaction from its memory.

What is claimed is:

1. A network call parking service in a communication network having one or more servers, comprising:

an invite request unit responsive to a parking party adapted to invoke the call parking service;

a call park request unit responsive to said invite request unit adapted to establish a connection to a call park destination to enable said caller to be parked at said destination, said destination being a user selectable parking location located anywhere within the network; and a retrieval request unit for connecting a call pickup party with said parked caller.

2. The service as recited in claim 1 further including an exception handler adapted to handle failures in the call parking service.

3. The service as recited in claim 1, wherein said call pickup party may be located anywhere within the network.

4. The service as recited in claim 1, wherein said parked caller may be picked up from anywhere within the network.

5. The service as recited in claim 1, where said parking party may be located anywhere within the network.

6. The service as recited in claim 1, where said parked-to-location may be located anywhere within the network.

7. The service as recited in claim 2, wherein said network failure may include excessive network congestion.

8. The service as recited in claim 2, wherein said network failure may include a vacant number.

9. The service as recited in claim 2, wherein said network failure may include no route to destination.

10. The service as recited in claim 1, wherein said user selectable park location is said destination's background task.

11. The service as recited in claim 1, further including a call recall unit for enabling said parked caller to be reconnected to said parking party after a predetermined time.

12. The service as recited in claim 11, wherein said call recall unit ensures that said parked caller is returned to said parking party if said parked party is not successfully retrieved within said predetermined time.

13. The service as recited in claim 1, wherein said user selected park location may be a virtual location in the network.

14. The service as recited in claim 1, wherein said network call park service is connected to the same user interface as a local call park service for enabling said network call park service network service to operate transparently.

15. The service as recited in claim 1, wherein said communication network includes client/servers.

16. The service as recited in claim 1, wherein said communication network includes PTN/Xs and servers.

17. The service as recited in claim 1, wherein said communication network includes mixed ISDN and client/servers.

18. The service as recited in claim 1, wherein the network call park service includes signalling primitives and mandatory data including invocation/invite, request, request return, execution, notification retrieval request, retrieval return, recall request and recall return.

19. The service as recited in claim 18, wherein the network call park service signalling incorporates conservation of links whereby unused links in the network are released throughout the duration of the call park service.

20. The service as recited in claim 18, wherein the network call park service signalling incorporates links by joining whereby unused links in the network are retained throughout the duration of the call park service.

21. The service as recited in claim 18, wherein the network call park service signalling includes a second backbone signalling connection when a generic server is employed for minimizing signalling and links on said ISDN network.

22. The service as recited in claim 1, wherein the network call park service may be interfaced to a known non-network call pickup and recall service.

23. The service as recited in claim 1, wherein the call park service uses static and dynamic user profile data to perform restrictions checks to allow or disallow parking and retrieval between predetermined users.

24. The service as recited in claim 1, wherein said network call service may interwork with a generic call pickup service and generic recall service.

25. The service as recited in claim 1, wherein the call park service uses a unique correlation number to associate all messages and transactions with a predetermined user.

* * * * *